United States Patent [19]

Lao

[11] 4,387,602
[45] Jun. 14, 1983

[54] PRESSURE COMPENSATED CIRCUIT FOR ION MASS AIRFLOW SENSORS

[75] Inventor: Binneg Y. Lao, Rancho Palos Verdes, Calif.

[73] Assignee: The Bendix Corporation, Southfield, Mich.

[21] Appl. No.: 231,634

[22] Filed: Feb. 4, 1981

[51] Int. Cl.³ ............................ G01F 1/64; G01F 1/78
[52] U.S. Cl. ................................................ 73/861.09
[58] Field of Search ........................................ 73/861.09

[56] References Cited

U.S. PATENT DOCUMENTS

| | | | |
|---|---|---|---|
| 3,831,445 | 8/1974 | Durbin | 73/861.09 |
| 4,248,086 | 2/1981 | Zizine | 73/861.09 |
| 4,272,995 | 6/1981 | Weistra | 73/861.09 |

Primary Examiner—Charles A. Ruehl
Attorney, Agent, or Firm—James R. Ignatowski; Russel C. Wells

[57] ABSTRACT

An improved detection circuit for an ion mass air flow sensor having a feedback circuit from the differential output of the sensor to the regulatory input of the high voltage supply. The feedback signal provides a second order correction to the output voltage of the high voltage power supply. This second order correction of high voltage power supply output voltage compensates the differential output of the sensor as a function of the airflow's pressure.

32 Claims, 5 Drawing Figures

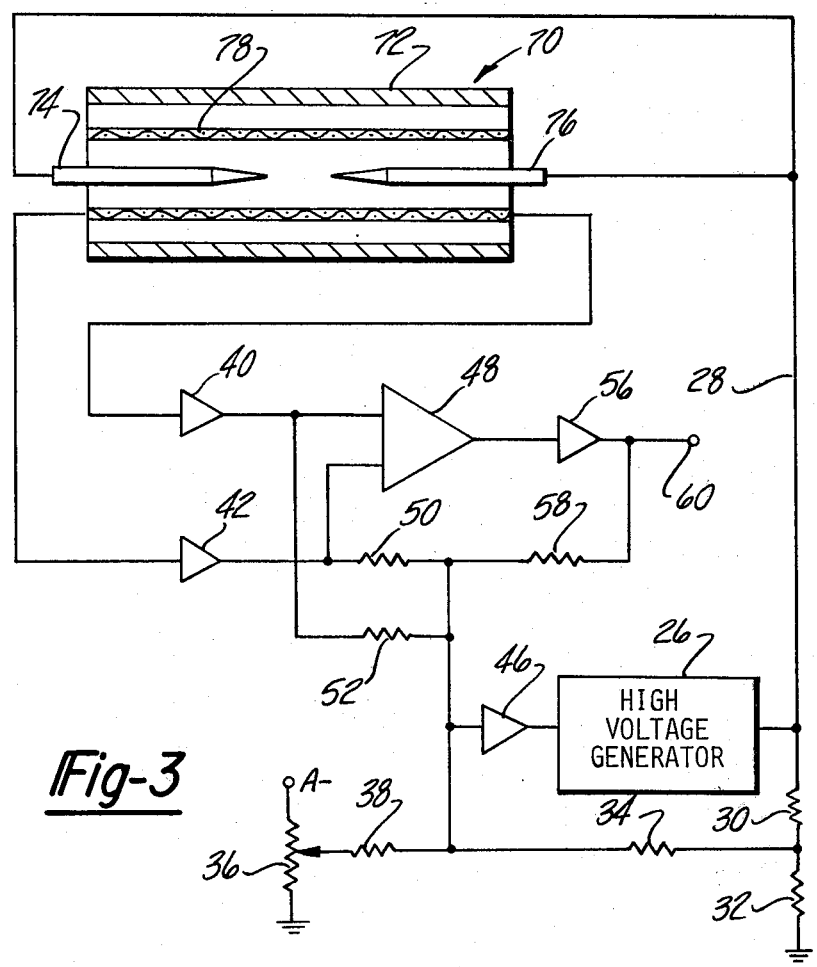
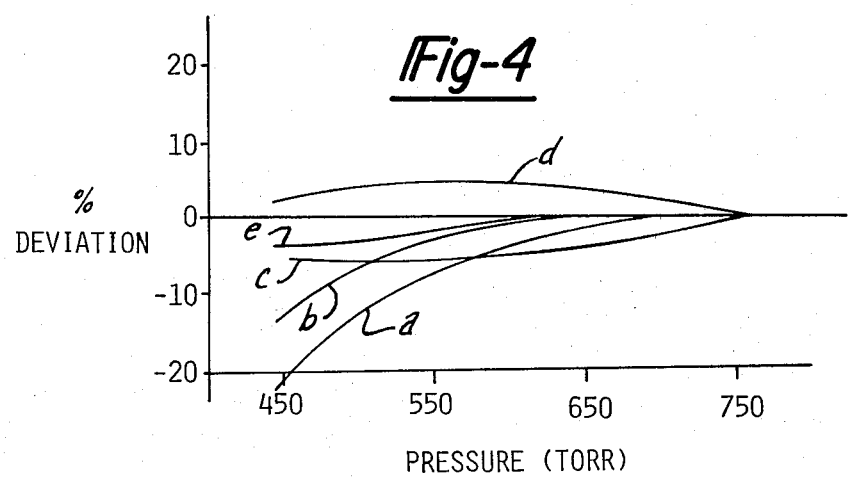

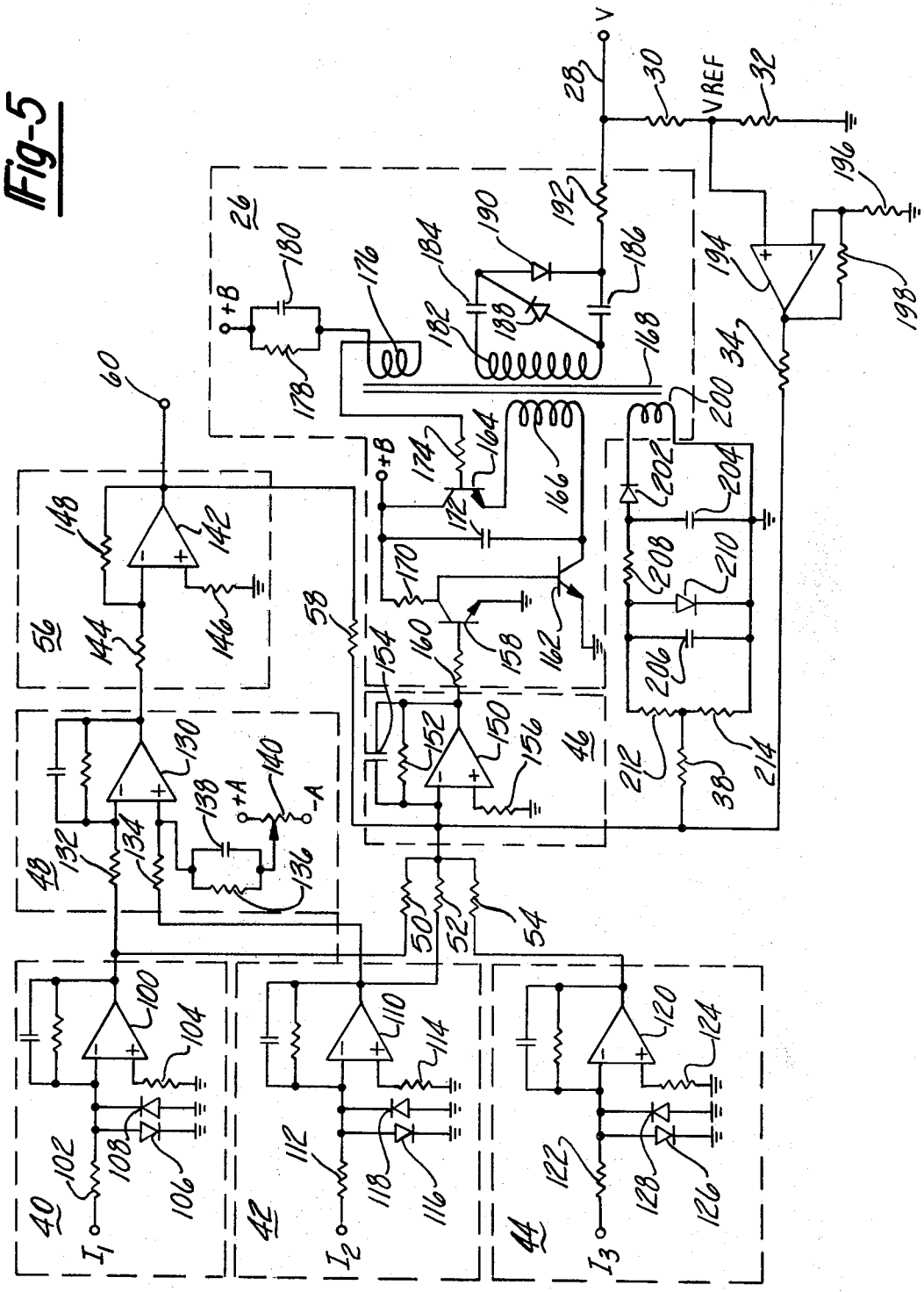

PRESSURE COMPENSATED CIRCUIT FOR ION MASS AIRFLOW SENSORS

BACKGROUND OF THE INVENTION

The invention pertains to fluid mass flow sensors and more particularly to a detection circuit for an ion mass airflow sensor compensated for the pressure of the airflow being detected.

Prior Art

Sensors which detect the mass flow rate of a fluid by ionizing at least a portion of the flowing fluid and detecting the quantity and distribution of the generated ions at one or more locations along the fluid flow path are well known in the art. One of the earliest sensors of this type disclosed by Blake in U.S. Pat. No. 1,808,709 embodied a radioactive ion source and a single collector electrode disposed down stream of the radioactive ion source. The fluid flow decreased the transit time between the ion source and the collector, therefore the collected ion current was indicative of the mass flow rate. Nagaiski in U.S. Pat. No. 4,152,935 introduced the concept of pulsing the ion source and detected the flow rate as a function of the time between the generation of the ions and their detection at a collector electrode.

Mellen in U.S. Pat. No. 2,611,268 introduced the concept of using two ion collector electrodes, one disposed upstream and one downstream of the ion source. The difference between the ion currents collected by the two electrodes was a measure of the fluid flow rate. The basic concept of ion collector electrodes disposed upstream and downstream of the ion source are exemplified in recently issued patents to Bullis in U.S. Pat. Nos. 4,074,572, Zizine, 4,056,003, Wiegand et al 4,019,383, and Durbin in 3,470,741 and 3,831,445. The Zizine and Wiegand mass flow sensors are structurally and functionally similar. These sensors have a central electrode which generates ions by means of a corona discharge. A pair of intermediate electrodes are disposed on either side of the central electrode, one upstream and on downstream. An ion collector electrode is placed behind each intermediate electrode on the side opposite the central electrode. The mass flow rate, dm/dt or m is computed from the difference in the ion currents, $\Delta I$, collected by the two collector electrodes which to a first approximation is given by the equation $$dm/dt = k(\Delta I/I)V$$

where k is a constant, I is the total ion current generated by the ion source and V is the potential of the ion source.

The sensor disclosed by Durbin is structurally different but functionally equivalent to the Zizine or Wiegand sensors and mass flow rate may be computed using the basic equation given above.

The problem with these sensors, the configuration disclosed by Zizine or Wiegand et al and the configuration disclosed by Durbin is that their output signal is dependent upon the pressure of the fluid passing through the sensor. Therefore their output signal is not indicative of the true mass flow rate.

SUMMARY OF THE INVENTION

The disclosed invention is a pressure compensated circuit for an ion mass airflow sensor of either the Zizine, Wiegand et al or Durbin configuration. The circuit comprises a difference amplifier generating an output indicative of the mass airflow rate of the fluid passing through the sensor, a high voltage generator circuit for generating a high voltage potential applied to centrally disposed corona discharge electrode as a function of the total ion current, and a feedback circuit for generating a feedback signal to the high voltage generator as a function of the detected differential ion current collected by the upstream and downstream electrodes. The generated feedback signal changing the value of the potential generated by the high voltage generator circuit thereby compensating the values of the collected ion currents for changes in the pressure of the fluid flowing through the detector.

The advantage of the disclosed circuit is that for a given flow rate the output signal generated in response to the difference between the ion currents collected by the collector electrodes is relatively independent of the pressure of the fluid in the sensor. Another advantage of the disclosed circuit is that the feedback signal is proportional to the fluid pressure. A still further advantage of the disclosed circuit is that it is adaptable to ion mass flow sensors of various configurations.

These and other advantages of the disclosed pressure compensated circuit for ion mass flow sensors will become apparent from a reading of the detailed description of the invention in conjunction with the drawings.

BRIEF DESCRIPTION OF THE FIGURES

FIG. 3 is a schematic of the pressure compensated circuit as applied to a Durbin type mass airflow sensor.

FIG. 4 is a graph showing the reduced pressure dependence provided by the disclosed circuit.

FIG. 5 is a detailed electrical schematic of the pressure compensated detection circuit.

DETAILED DESCRIPTION OF THE INVENTION

Figure 1:
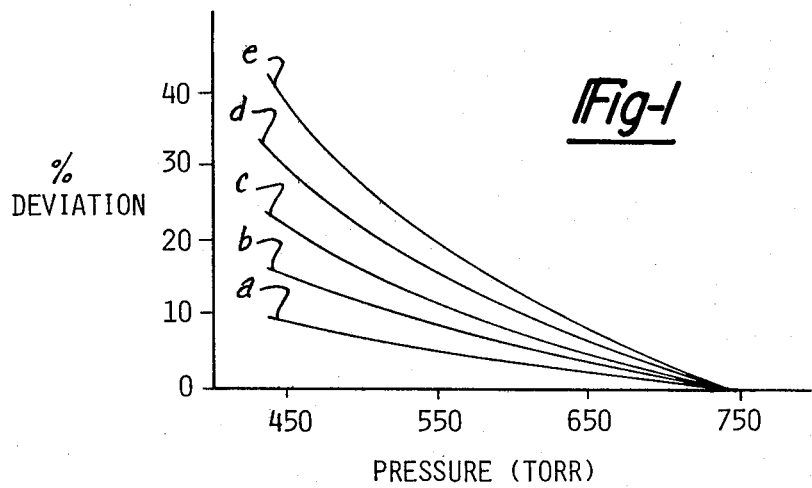
FIG. 1 is a graph showing the pressure dependence of an ion mass airflow sensor.

FIG. 1 is a graph showing the pressure dependence of an ion mass airflow sensor's output signal as a function of the pressure at which the mass air was measured. The pressure dependence data was obtained with a Zizine type mass airflow sensor using a detection circuit of the type disclosed in U.S. Pat. No. 4,056,003. Curve "a" represents a flow rate of 708 standard liters per minute, curve "b" represents a flow rate of 1,416 liters per minute, curve "c" represents a flow rate of 2,832 liters per minute, curve "d" represents a flow rate of 4,248 liters per minute, and curve "e" represents a flow rate of 5,664 liters per minute. In English units the curves "a" through "e" represent flow rates of 25, 50, 100, 150 and 200 cubic feet per minute, respectively, measured at standard atmospheric pressure. Similar tests conducted with a mass airflow sensor of the type disclosed by Durbin in U.S. Pat. No. 3,831,445 exhibited similar pressure dependence with a somewhat larger magnitude.

The differential ion current, $\Delta I$, between the two collector electrodes of the sensor is giving by the equation:

$$\Delta I = k(I/V)m \tag{1}$$

Where
- k is a constant
- I is the total ion current
- V is the voltage of the central electrode and m is the mass flow rate dm/dt; of the air through the sensor.

In practice, the average fluid strength E between the ionizing electrode and the intermediate electrodes may be written as $$E = (V - V_o)/d \qquad (2)$$

where:
- d is the distance between electrodes,
- V is the potential difference between the ionizing electrodes and the intermediate electrodes, and
- $V_o$ is an offset potential. The offset potential $V_o$ is believed to arise from two causes. First there is a steep potential drop in the immediate vicinity of the ionizing electrode. Because this potential drop is highly localized, it does not contribute to the average electric fluid E in the bulk of the spacing between the ionizing electrode and the intermediate electrodes. Second, positive space charges in and near the intermediate electrodes, where the field is low, tend to mask the intermediate electrode causing a corresponding reduction in the electric field. The mass airflow rate dm/dt may therefore be written as $$dm/dt = k[(V - V_o)/I] \Delta I \qquad (3)$$

Then, if $(V - V_o)/I$ is kept a constant by the electronics $\Delta I$ is a direct measure of the mass flow rate.

Subsequent experiments have shown that the offset potential $V_o$ can be used to minimize the pressure dependence of the system. The output signal $\Delta I$ is more or less proportional to the total current I. Therefore, by increasing the offset potential $V_o$ the output $\Delta I$ can be reduced at low pressures relative the output at high pressures. Graphically, by adjusting $V_o$ the family of curves shown on FIG. 1 can be pivotally rotated about the data point at atmospheric pressure. Therefore the percent deviation for any flow rate may be minimized through the selection of the offset potential $V_o$. The adjustment or selection of $V_o$ however only rotates the entire set of flow rate curves but does not reduce the spread between the different flow rate curves.

Ideally the spread between the different flow rate curves could be individually corrected by the generation of a flow rate dependent offset potential $V_o(m)$ which would rotate each curve as a function of the flow rate. Since the rotation of each individual curve required to minimize the deviation is a function of the flow rate m, the flow rate dependent offset potential $V_o(m)$ may be expressed in the following form $$V_o(m) = V_o - f(m) \qquad (4)$$

where $V_o$ is a constant offset potential. The function f(m) may, to a first approximation, be a linear function such that $$f(m) = \alpha m \qquad (5)$$

where $\alpha$ is a linear conversion factor. Substituting $\alpha m$ for f(m) in equation (4) we obtain $$V_o(m) = V_o - \alpha m$$

and substituting $V_o(m)$ for $V_o$ in equation (3) we obtain $$dm/dt = k[(V - V_o + \alpha m)/I] \Delta I \qquad (6)$$

Figure 2:
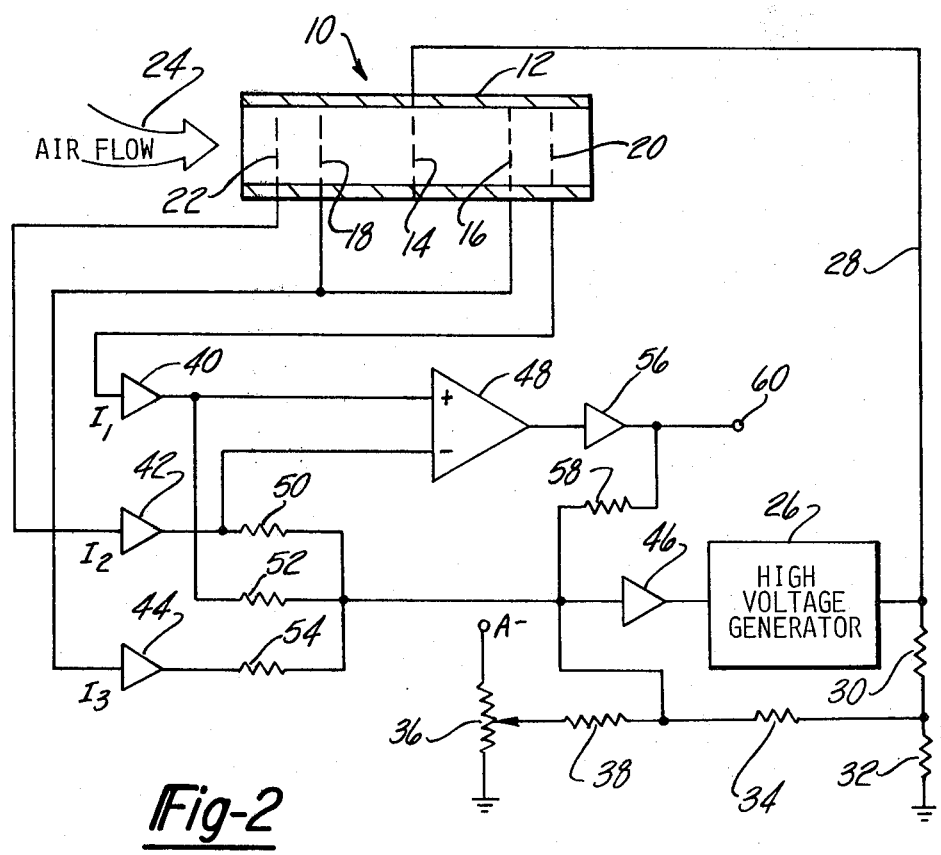
FIG. 2 is a schematic of the pressure compensated circuit as applied to either a Zizine or Wiegand et al ion mass airflow sensor.

The implementation of equation (6) in a pressure compensated circuit for an ion mass airflow sensor of the type disclosed by Zizine is illustrated in FIG. 2.

Referring to FIG. 2, the Zizine type ion mass airflow sensor 10 has an external housing 12 defining an airflow path through the sensor. Centrally disposed in housing 12 is a corona electrode 14 transverse to the flow path. Disposed either side of the corona electrode 14 are a pair of intermediate electrodes 16 and 18 respectively. Collector electrodes 20 and 22 are disposed adjacent to the intermediate electrodes 16 and 18 on the sides opposite the corona discharge electrode 14. The airflow to be measured passes through the sensor 10 in the direction indicated by arrow 24.

A high voltage generator 26 generates a high voltage output which is connected to the corona electrode 14 by means of line 28 and to ground through a voltage divider consisting of resistances 30 and 32. The junction between resistances 30 and 32 is connected back to the input of an integrator 46 through a resistance 34. A potentiometer 36 connected between a negative voltage source designated A— and ground, generates a negative offset voltage $V_o$ at its wiper terminal. The wiper terminal of potentiometer 36 is connected to the input of integrator 46 through a resistance 38.

A first ion current to voltage operational amplifier 40 has its input connected to the down steam collector electrode 20. A like second ion current to voltage amplifier 42 has its input connected to the upstream collector electrode 22. A third ion current to voltage amplifier 44 has its input connected to intermediate electrodes 16 and 18.

The outputs of amplifiers 40 and 42 are connected to the positive and negative inputs respectively of a differential amplifier 48 and in parallel to resistances 50 and 52 respectively. The output of amplifier 44 is connected to a resistance 54. The opposite ends of resistances 50, 52 and 54 are connected together and to the input of integrator 46. The output of integrator 46 in connected to the input of the high voltage generator 26.

The output of differential amplifier 48 is connected to the input of a buffer amplifier 56. The output of buffer amplifier 56 is connected to the input of integrator 46 through a resistance 58 and to the output terminal 60. The output of buffer amplifier 56 is a signal m indicative of the pressure compensated mass flow rate of the air mass passing through sensor 10.

The operation of the circuit is as follows:

The high voltage from the high voltage generator 26 causes electrode 14 to produce a corona discharge ionizing the air in the immediate vicinity of electrode 14. The ions generated by the corona discharge are accelerated in both directions towards the intermediate electrodes 16 and 18 respectively by the electric field generated between corona electrode 14 and the intermediate electrodes. The collector electrodes 20 and 22 are effectively at the same potential as the intermediate electrodes so that in the absence of an airflow through the sensor 10, the intermediate electrodes 16 and 18 effectively collect most of the ions, however a small number ions will pass through electrodes 16 and 18 and be collected by the collector electrodes 20 and 22.

The ion current collected by the intermediate electrodes 16 and 18 and collector electrodes 20 and 22 are converted to voltage signals by operational amplifiers 40, 42 and 44 which produce output signals having a voltage corresponding to the number of ions collected by their respective electrodes.

The output signals from operational amplifiers 40, 42 and 44 are summed to generate a total ion current signal I. A reference signal indicative of V is generated at the junction of the voltage divider comprising resistances 30 and 32. Another signal indicative of the desired negative offset voltage $V_o$ is derived from the wiper terminal of potentiometer 36.

An airflow through the sensor 10 in the direction of arrow 24 increases the velocity of the generated ions towards intermediate electrode 16 and decreases the velocity of ions towards intermediate electrode 18. Because of these changes in the velocities of the generated ions, a greater number of ions now pass through intermediate electrode 16 and are collected by collector electrode 20, and a lessor number of ions pass through intermediate electrode 18 and collected by collector electrode 22. The ions collected by collector electrodes 20 and 22 generate ion currents $I_1$ and $I_2$ respectively which are converted to voltage signals by operational amplifiers 40 and 42. The outputs of operational amplifiers 40 and 42 are summed with the output of operational amplifier 44 and produce a sum signal corresponding to the total ion current of the sensor as previously described. The outputs of amplifiers 40 and 42 are also received by the difference amplifier 48 which produces an output signal $\Delta I$ having a value indicative of the difference between the ion currents $I_1$ and $I_2$ collected by collector electrodes 20 and 22. The output of difference amplifier 48 is amplified by buffer amplifier 56. The difference signal output at terminal 60 by buffer amplifier 56 is measure of the mass airflow rate (m) through the sensor 10. The signals indicative of the total current I, the voltage V, the negative offset voltage $-V_o$ and the mass flow rate $\alpha m$ are summed at the input of integrator 46.

The weighting factor for each term being summed at the input to integrator 46 is determined by the proper choice of the values for resistances 34, 38, 50, 52, 54, and 58 such that:

$$V - V_o + \alpha m - CI = O$$

where $\alpha$ and C are constants. This equation may be rewritten as:

$$(V - V_o + \alpha m)/I = C \qquad (7)$$

Substituting this back in equation (6) we obtain:

$$m = kC\Delta I$$

That is, the mass air flow rate m is proportional to the difference between the ion currents $\Delta I$ collected on the upstream and downstream electrodes.

It is emphasized that the compensation achieved by the circuit shown in FIG. 2 is linear in m and V and in accordance with equation (6). Better compensation can be achieved if Equation (7) is written in its nonlinearized form as follows:

$$[g(V) + f(m)]/I = C \qquad (8)$$

where:
$$g(V) = -V_o + V + aV^2 + bV^3 + \cdots$$

and $$f(m) = \alpha m + \beta m^2 + \cdots$$

Equation (8) may be implemented using a programmed digital microprocessor to compute the functions g(V) and f(m), when more precise compensation is required.

The same circuit may also be used with the ion mass airflow sensor of the type taught by Durbin. Referring now to FIG. 3, the Durbin type ion mass airflow sensor 70 comprises a housing 72 defining an airflow passage, a pair of needle electrodes 74 and 76 for producing a corona discharge to ionize the airflowing through the housing 72 and a resistive cylindrical collector 78 disposed concentric with the needle electrodes 74 and 76. Both needle electrodes are connected to the output of the high voltage generator 26 while the opposite ends of the cylindrical collector 78 are connected to the inputs of ion current-to-voltage operational amplifiers 40 and 42. Since the Durbin type sensor does not have any electrodes comparable to the intermediate electrodes of the Zizine type sensor, buffer amplifier 44 is not required. The resistive collector 48 collects all of the ions generated, therefore the sum of the voltages output from amplifiers 40 and 42 is the total ion current. Because collector 78 is resistive, the difference in the current $\Delta I = I_1 - I_2$ produced at its opposite ends is a signal indicative of the mass airflow rate m through the sensor.

The remainder of the elements in the pressure compensated detection circuit are functionally the same as those shown on FIG. 2 and have the same identifying indicia.

The operation of circuit is the same as described with reference to the Zizine sensor and the detection circuit shown in FIG. 2. Briefly, the ion currents generated at the ends of the resistive collector 78 are converted to voltage signals by amplifiers 40 and 42. The sum of the output voltage of these two amplifiers are compared with the reference voltage $(V - V_o + \alpha m)$ and the difference between the sum voltage and the reference voltage is the error signal which feeds integrator 46. The integrator 46 in turn controls the output voltage level of high voltage generator 26 keeping the relationship $(V - V_o + \alpha m)/I$ a constant. The difference between the two ouputs of amplifiers 40 and 42 is amplified by difference amplifier 48 and output on terminal 60 through buffer amplifier 56. The output of buffer amplifier 56 is the signal m which is proportional to the mass airflow rate through. The feedback from the output of buffer amplifier 56 through resistance 58 is summed with the reference voltage $(V - V_o)$ to produce the pressure compensated reference signal $(V - V_o = \alpha m)$ as previously described.

FIG. 4 is a graph shown the reduction in the pressure dependence of a Zizine type sensor obtained using the disclosed pressure compensated detection circuit. The flow rate curves "a" through "e" are for the same flow rates illustrated in FIG. 1.

The pressure compensation detection circuit shown on FIG. 3 may also be used with the Durbin type split collector electrode sensor disclosed in U.S. Pat. No. 3,470,741 or the ion mass flow sensor disclosed by Bullis et al in U.S. Pat. No. 4,074,572 which corresponds to the Zizini type sensor without the intermediate electrodes.

A detailed schematic diagram of the pressure compensated detection circuit as shown in FIG. 5. The amplifiers 40, 42 and 44 are identically repeated current to voltage converter circuits. Therefore only amplifier 40 will be discussed in detail. The converter circuit 40 comprises an operational amplifier 100 receiving the ion current $I_1$ at its inverting input through a resistance 102. The noninverting input to amplifier 100 is connected to ground through resistance 104. Diodes 106 and 108 connected between the inverting input to amplifier 100 and ground function as signal clippers limiting the magnitude of the signal applied to the inverting input of amplifier 100. The output of amplifier 100 is a negative potential proportional to the ion current $I_1$. In a like manner the outputs of amplifier 110 and 120 are negative potentials proportional to ion currents I2 and I3, respectively.

The difference amplifier 48 comprises an amplifier 130 having its inverting input connected to the output of amplifier 100 through a resistance 132 and its noninverting input connected to the output of amplifier 110 through a resistance 134. The noninverting input to amplifier 130 is also connected to a null circuit comprising resistance 136, capacitor 138 and potentiometer 140 connected between a positive and a negative source of electrical power designated A+ and A− respectively. The null circuit provides a means for compensating for the circuit offset when there is no airflow through the sensor.

The buffer amplifier 56 comprises an amplifier 142 having its inverting input connected to the output of amplifier 130 through resistance 144 and its non-inverting input connected to a common ground through resistance 146. The output of amplifer 142 is the mass flow rate signal m which is output on terminal 60. The output of amplifier 142 is also connected back to it inverting input by feedback resistance 148 which in combination with resistance 144 controls the gain of amplifier 142.

The inputs to the high voltage generator 26 are received by a integrator circuit 46 comprising amplifier 150, resistance 152 and capacitor 154. The resistance 152 and capacitor 154 are connected between the output of amplifier 150 and its inverting input. The inverting input to amplifier 150 is also connected to the output of amplifiers 100, 110, and 120 through reistances 50, 52 and 54 respectively and to the output of amplifier 142 through resistance 58. The noninverting input to amplifier 150 is connected to the common ground through resistance 156.

The output of amplifier 150 is connected to the base of transistor 158 through a resistance 160. Transistor 158 in combination with transistors 162 and 164 control the current flow through the primary coil 166 of transformer 168. The collector of transistor 158 is connected to a source of electrical power designated B+ through a resistance 170 and to the base of transistor 162. The emitter of transistor 158 is connected directly to the common ground. The primary coil 166 is connected to the B+ source of electrical power through the collector-emitter terminals of transistor 164 and to the common ground through the collector-emitter terminals of transistor 162. A capacitor 172 is connected between the B+ source of electrical power and the collector of transistor 162.

The base of transistor 164 is connected to the B+ source of electrical power through resistance 174, tickler coil 176 of transformer 168 and a tuned circuit comprising resistance 178 and capacitor 180 connected in parallel. The tuned circuit comprising resistance 178 and capacitance 180 in combination with tickler coil 176, transistor 164 and primary coil 166 form an oscillator circuit controlling the frequency of the current flow through the primary coil 166. Transistor 162 in combination with amplifier 150 and transistor 158 controls the magnitude of the current flowing through the primary coil 166 in response to the signal received at the input of amplifier 150. The magnitude of the current flowing through primary coil 166 determines the output voltage generated across the secondary coil 182 of the transformer.

The opposite ends of secondary coil 182 are connected to a voltage doubler circuit comprising capacitors 184 and 186 and diodes 188 and 190 which produces a direct current output voltage at the junction between capacitor 186 and diode 190 having a value approximately equal to two times the peak voltage generated across secondary coil 182. The output voltage of the voltage doubler circuit is connected to the corona discharge electrode of the ion mass flow sensor through resistance 192 and line 28 as shown on FIGS. 2 or 3. Line 28 is also connected to the common ground through a voltage divider comprising serially connected resistances 30 and 32 as previously shown and generates the reference voltage V at the junction between the two resistances.

The junction between resistances 30 and 32 is connected to the noninverting input of amplifier 194. The inverting input to amplifier 194 is connected to the common ground through resistance 196. The output of amplifier 194 is connected back to its inverting input by feedback resistance 198 and to inverting input of amplifier 150 in the integrator circuit 46 through resistance 34.

A half wave rectifier comprising diode 202, capacitor 204 and 206, resistance 208 and zener diode 210 are connected to an auxiliary coil 200 of transformer 168. The half wave rectifier produces a negative voltage across capacitor 206 which is regulated to a predetermined value by zener diode 210. A voltage divider comprising serially connected resistances 212 and 214 generates the negative offset potential $V_o$ at the junction between these two resistances. Resistance 38 connects the junction between resistances 212 and 214 to the inverting input to amplifier 150. The half wave rectifier and voltage divider comprising serial resistances 212 and 214 are the circuit equivalents of potentiometer 36 and its associated A− source of electrical power illustrated in FIGS. 2 and 3. The resistances 30, 32, 34, 38, 50, 52, 54 and 58 of FIG. 5 are the resistances having the same indicia illustrated in FIGS. 2 and 3.

Having disclosed the pressure compensated detection circuit for an ion type mass flow sensor with reference to a specific embodiment it is not intended that the invention be limited to the details of circuits illustrated and described. A person skilled in the art would be capable of devising different circuits capable of performing the same functions without departing from the scope and spirit of the invention as set forth in the appended claims.

What is claimed is:

1. A pressure compensated detection circuit for an ion mass flow sensor having at least one corona electrode generating ions by corona discharge and at least one ion collector electrode collecting the generated ions to produce at least two collected ion currents, said circuit comprising:

first means for generating a mass flow rate signal in response to the collected ion currents;

second means for generating a total ion current signal indicative of the total number of ions generated in response to said collected ion currents;

third means for generating a pressure compensation signal in response to said mass flow rate signal;

fourth means for summing said pressure compensation signal with said total ion current signal and a reference signal to generate a control signal; and high voltage generator means for generating a high voltage signal applied to the sensor's corona electrode in response to said control signal, said high voltage signal having a value keeping the relationship of the total ion current to said pressure compensation signal and said reference signal a constant.

2. The circuit of claim 1 wherein said fourth means comprises:

means for generating said reference signal having a value proportional to an algebraic function, g(V) of said high voltage signal; and means for summing said reference signal with said total ion current signal and said pressure compensation signal to generate said control signal.

3. The circuit of claim 2 wherein said third means generates a pressure compensation signal having a value proportional to an algebraic function, f(m) of said mass flow rate signal.

4. The circuit of claim 3 wherein the algebraic function, f(m) is a linear function of the mass flow rate m such that:

$$f(m) = \alpha m$$

where $\alpha$ is a constant.

5. The circuit of claim 3 wherein the algebraic function, f(m) is a nonlinear function of the mass flow rate, m, such that:

$$f(m) = \alpha m + \beta m^2 + \cdots$$

where $\alpha$ and $\beta$ are constants.

6. The circuit of claim 3 wherein the algebraic function, g(V) is a linear function of said high voltage signal such that:

$$g(V) = V - V_o$$

where V is proportional to said high voltage signal, $V_o$ is an offset voltage.

7. The circuit of claim 3 wherein the algebraic function g(V) is a nonlinear function of said high voltage signal such that:

$$g(V) = -V_o + V + aV^2 + bV^3 + \cdots$$

where V is proportional to said high voltage signal, $V_o$ is an offset voltage and a and b are constants.

8. The circuit of claim 3 wherein said high voltage generator means comprises:

integrator means for generating an integrated control signal C having a value:

$$C = [g(V) + f(m)]/I$$

where I is said total ion current; and a high voltage generator for generating in response to said integrated control signal C a high voltage signal having a value operative to maintain the value of said integrated control signal C constant.

9. The circuit of claim 2 wherein said means for generating said reference signal includes:

a voltage divider circuit for generating a base reference signal having a value V proportional to said high voltage signal;

means for generating an offset signal having a fixed value $V_o$; and means for summing said base reference signal with said offset signal to generate said reference signal having a value equal to $V-V_o$.

10. The circuit of claim 9 wherein said third means generates a pressure compensation signal having a value $\alpha m$ where $\alpha$ is a constant and m is said mass flow rate signal.

11. The circuit of claim 10 wherein said high voltage generator means comprises:

integrator means for integrating said control signal to generate an output signal C having a value:

$$C = [V - V_o + \alpha m]/I$$

where I is said total ion current; and a voltage generator for generating in response to said output signal C a high voltage signal having a value operative to maintain the value of said output signal C a constant.

12. The circuit of claim 11 wherein said voltage generator comprises:

a step up voltage transformer having at least a primary coil, a secondary coil and an oscillator coil;

oscillator circuit means for controlling the oscillatory frequency the current flowing through said primary coil in response to the signal induced in said oscillator coil;

regulator circuit means for controlling the magnitude of the current flowing through said primary coil in response to said output signal C; and means for generating said high voltage signal in response to the voltage induced in said secondary coil by the current flow through said primary coil.

13. The circuit of claim 12 wherein said step-up transformer further includes an auxiliary coil, said means for generating an offset signal comprises:

a rectifier circuit for generating at its output a regulated negative d.c. voltage in response to the signal induced in said auxilliary coil by the current flow in said primary coil; and a voltage divider circuit connected to the output of said rectifier circuit for generating said offset signal having a value $V_o$ proportional to said regulated negative d.c. voltage.

14. The circuit of claim 1 wherein the sensor's at least one ion collector electrode is a resistive member extending in opposite directions either side of said at least one corona electrode in a direction parallel to the mass flow through the sensor and wherein the at least two collected ion currents are the current flows from the opposite ends of said resistive member; said first means is a difference amplifier means generating said mass flow rate signal in response to the difference between the current flows from the opposite ends of said resistive member and said second means is a summing circuit generating said total ion current signal having a value equal to the sum of the current flows from the opposite ends of said resistive member.

15. The circuit of claim 14 wherein said first and second means are preceded by a pair of converters for converting said collected ion currents to corresponding voltage signals, one of said converters is responsive to the collected ion current flow from one end of the resistive member and the other converter responsive to the collected ion current flow from the opposite end of the resistive member.

16. The circuit of claim 1 wherein said at least one ion collector electrode is two ion collector electrodes symetrically disposed on opposite sides of said corona electrode in a direction parallel to the mass flow through the sensor and each ion collector electrode produces an ion current indicative of the number of ions it collects, said first means is a difference amplifier means for generating said mass flow rate signal in response to the difference between the ion currents collected by said two ion collectors and said second means is a summing circuit for summing said two ion currents to generate said total ion current signal.

17. The circuit of claim 16 wherein said first means further includes a pair of converters preceeding said difference amplifier means for converting said ion currents to corresponding voltage signals and said difference amplifier means generates said mass flow rate signal in response to the difference between said corresponding voltage signals; and
  wherein said summing circuit generates said total ion current signal in response to said corresponding voltage signals.

18. The circuit of claim 16 wherein the sensor further includes a pair of intermediate electrodes, one of the intermediate electrodes disposed between each of the ion collector electrodes and the corona electrode and wherein the intermediate electrodes produce ion currents indicative of the number of ions they collect, said summing circuit further sums the ion currents of the intermediate electrodes with the ion currents of the collector electrodes to generate said total ion current signal.

19. The circuit of claim 17 wherein the sensor further includes a pair of intermediate electrodes one disposed between each of the ion collector electrodes and the corona electrode and producing ion currents indicative of the ions they collect, said circuit further including a converter means for converting the ion currents of the intermediate electrodes into a corresponding voltage signal and said summing means further sums the corresponding voltage signal of the intermediate electrodes with the corresponding voltage signals of the ion collector electrodes to generate said total ion current signal.

20. A pressure compensated detection circuit for an ion mass flow sensor having at least one corona electrode generating ions by corona discharge and a resistive ion collector for collecting the generated ions and producing ion currents at its opposite ends comprising:
  differential amplifier means for generating a mass flow rate signal in response to the difference in the ion currents generated at the opposite ends of the resistive ion collector;
  sum amplifier means for summing the ion currents produced at the opposite ends of the resistive ion collector to generate a total ion current signal;
  means for generating a pressure compensation signal having a value proportional to said mass flow rate signal;
  means for summing said pressure compensation signal with said total ion current signal and a reference signal to generate a control signal;
  high voltage generator means for generating a high voltage signal applied to the at least one corona electrode in response to said control signal, said high voltage signal having a value maintaining the relationship of said total ion current to said pressure compensation signal and said reference signal a constant; and
  signal divider means for dividing said high voltage signal to generate said reference signal.

21. The detection circuit of claim 20 wherein said signal divider means includes:
  means for generating an offset signal having a fixed value; and
  divider means for generating a voltage reference signal having a voltage proportional to said high voltage signal; and
  means for subtracting said offset signal from said voltage reference signal to generate said reference signal.

22. The circuit of claim 21 wherein said high voltage generator means generates a high voltage signal operative to maintain the relationship $(V - V_o + \alpha m)/I$ a constant
where
  V is said voltage reference signal
  $V_o$ is said offset signal
  $\alpha$ is a constant
  m is said mass flow signal
  and
  I is said total ion current signal.

23. A pressure compensated detection circuit for an ion mass flow sensor having a centrally disposed corona electrode generating ions by corona discharge, a first and second ion collector symmetrically disposed one on each side of the corona electrode along a path parallel to the mass flow, said first and second ion collectors collecting the generated ions to produce a first and second ion current respectively, characterized by:
  a differential amplifier means for generating a mass flow rate signal in response to the difference between said first and second ion currents;
  sum amplifier means for summing said first and second ion currents to generate a total ion current signal;
  means for generating a pressure compensation signal having a value proportional to said mass flow rate signal;
  means for summing said pressure compensation signal with said total ion current signal and a reference signal to generate a control signal; and
  high voltage generator means for generating a high voltage applied to said corona electrode in response to said control signal, said high voltage having a value keeping the relations of the total ion current to said pressure compensation signal and said reference signal a constant.

24. The detection circuit of claim 23 wherein said means for summing further includes:
  means for generating a voltage reference signal having a value proportional to said high voltage;
  means for generating an offset signal having a fixed value; and
  means for summing said voltage reference signal with said offset signal to generate said control reference signal.

25. The detection circuit of claim 24 wherein said high voltage generator means generates a high voltage operative to maintain the relationship $(V-V_o+\alpha m)/I$ a constant where V is said voltage reference signal $V_o$ is said offset signal $\alpha m$ is said pressure compensation signal where $\alpha$ is a constant and m is said mass flow rate signal and I is said total ion current signal.

26. The detection circuit of claim 23 or 25 wherein the mass flow rate sensor further includes a pair of intermediate electrodes one disposed each side of the corona electrode between the corona electrode and the first and second ion collectors, said intermediate electrodes collecting a portion of the generated ions to generate intermediate electrode ion currents, said sum amplifier means further summing said intermediate electrode ion currents with said first and second ion currents to generate said total ion current signal.

27. A method for pressure compensating the output of an ion mass flow rate sensor having at least one corona electrode producing ions by corona discharge and at least one ion collector collecting the generated ions to produce at least two ion currents, comprising the steps of:

amplifying the difference between said two ion currents to generate a mass flow rate signal;

amplifying the sum of said two ion currents to generate a total ion current signal;

generating a reference signal;

correcting said reference signal as a function of said mass flow rate signal to generate a pressure compensated reference signal; and summing said pressure compensated reference signal with said total ion input current signal to generate a control signal controlling a high voltage generator with said control signal to generate a high voltage signal applied to the corona electrode, said high voltage signal activating said corona electrode to generate a corona discharge generating ions at a rate maintaining the relationship of the total ion current to the pressure compensated reference signal a constant.

28. The method of claim 27 wherein said step of generating a reference signal comprises the steps of:

dividing said high voltage signal by a predetermined factor to generate a voltage dependent reference signal;

generating an offset signal having a constant value;

subtracting said offset signal from said voltage dependent reference signal to generate said reference signal.

29. The method of claim 28 wherein said step of correcting said reference signal includes the steps of:

multiplying said mass flow rate signal by a predetermined factor to generate a pressure correction signal; and adding said pressure correction signal to said reference signal to generate said pressure compensated reference signal.

30. The method of claim 29 wherein said step of controlling a high voltage generator generates a high voltage signal maintaining the relation $(V-V_o+\alpha m)/I$ a constant where:

V is said voltage dependent reference signal $V_o$ is said offset signal $\alpha m$ is said pressure correction signal $\alpha$ is said predetermined factor m is said mass flow rate signal and I is said total ion current.

31. The method of claims 27 or 29 wherein said at least one ion collector is a pair of ion collectors disposed symmetrically on opposite sides of the corona electrode in a direction parallel to the mass flow, one of said collectors collecting the ions up stream of the corona electrode and producing the first of said ion currents and the other ion collector collecting the ions downstream of the corona electrode and producing the second ion current.

32. The method of claims 27 or 29 wherein said at least one ion collector is a pair of ion collectors disposed symmetrically on opposite sides of said corona electrode in a direction parallel to the mass flow, and wherein said sensor further includes a pair of intermediate electrodes, one intermediate electrode disposed between each ion collector and corona electrode, said step of amplifying the difference amplifies the difference between the ion currents collected by said ion collectors to generate said mass flow rate signal and said step of amplifying the sum amplifies the sum of the ion currents collected by both ion collectors and both intermediate electrodes to generate said total ion current signal.

* * * * *